United States Patent [19]

Bodensteiner et al.

[11] Patent Number: 4,685,868
[45] Date of Patent: Aug. 11, 1987

[54] VACUUM JET APPARATUS

[76] Inventors: Donald A. Bodensteiner, Rte. 2; David Wenthold, Box 207, both of Waucoma, Iowa 52171

[21] Appl. No.: 936,984

[22] Filed: Nov. 28, 1986

Related U.S. Application Data

[63] Continuation of Ser. No. 763,682, Aug. 8, 1985, abandoned.

[51] Int. Cl.⁴ .................. F04B 21/00; F04B 17/00
[52] U.S. Cl. .................. 417/405; 417/430; 417/900; 366/270; 415/121 B
[58] Field of Search ............ 417/36, 38, 40, 53, 417/85, 148, 405, 430, 900; 137/205; 366/139, 196, 270; 15/385; 406/135, 145; 415/121 B

[56] References Cited

U.S. PATENT DOCUMENTS

| | | | |
|---|---|---|---|
| 1,714,287 | 5/1929 | Wilson | 15/385 |
| 2,930,394 | 3/1960 | Bellows | 137/205 |
| 3,240,476 | 3/1966 | McVey et al. | 366/270 |
| 3,367,583 | 2/1968 | Kellog | 366/270 |
| 3,775,805 | 12/1973 | Mitchell et al. | 15/385 |
| 3,785,752 | 1/1974 | Crespo . | |
| 3,799,690 | 3/1974 | Klaas . | |
| 4,028,017 | 6/1977 | Kobiske | 417/900 |
| 4,175,872 | 11/1979 | Primus | 366/139 |
| 4,329,069 | 5/1982 | Graham | 366/270 |
| 4,408,724 | 10/1983 | Meyer | 415/121 B |
| 4,417,850 | 11/1983 | Hacker et al. . | |
| 4,441,824 | 4/1984 | Brokaw | 366/319 |
| 4,445,823 | 5/1984 | Zyduck | 417/430 |

FOREIGN PATENT DOCUMENTS 35138  3/1980  Japan .................. 415/121 B

OTHER PUBLICATIONS

"DP-24 Pumper Tractor Powered Drainage Pump"; Vermeer Manufacturing Company, Pella, Iowa.
"PIT PAL Liquid Manure Handling System"; Farmstar, Glenwood, Minnesota.
"PIT PROP"; Farmstar; Glenwood, Minnesota.

Primary Examiner—Louis J. Casaregola
Assistant Examiner—Timothy S. Thorpe
Attorney, Agent, or Firm—Emrich & Dithmar

[57] ABSTRACT

A hydraulically-driven, vacuum jet apparatus is capable of drawing a liquid and solid mixture from a holding receptacle or container and of blending the mixture to provide a uniformly distributed liquid and solid solution. An intake assembly positioned on one end of an elongated tube agitates and thoroughly blends the mixture to an easily displaceable slurry using a rotating, hydraulically actuated propeller positioned outside and beyond a lower end of the tube to permit the solution to be vacuum drawn up through the tube and into a vacuum tank.

9 Claims, 3 Drawing Figures

VACUUM JET APPARATUS

This is a continuation of application Ser. No. 763,682, filed Aug. 8, 1985, now abandoned.

BACKGROUND OF THE INVENTION

This invention relates generally to apparatus for displacing solid and liquid mixtures and is particularly directed to a vacuum jet apparatus for drawing and blending a solid and liquid mixture and removing it from a holding container.

Prior art arrangements for removing a solid/liquid mixture from a holding container have generally involved the use of a rotary pump having a propeller, or impeller, for directing the mixture under pressure through a discharge hose. Where the solid portion of the mixture is deposited upon the lower surface of the holding container, as is generally the case, such pumps are generally limited to the removal of the liquid portion of the mixture leaving the solid material in the holding container. This is highly undesirable in many applications where it is advantageous and possibly essential to collect both portions of the mixture. Such is the case in manure pits wherein waste from livestock collects in a pit located beneath a structure in which the animals are housed. The liquid and solid portions of the waste material differ in fertilizer value, with the solid portion generally providing more concentrated amounts of fertilizing materials. Thus, it is highly desirable for the farmer to remove all of the material, both liquid and solid, which collects in the manure pit and to remove it in such a way that the fertilizer value of the overall mixture is generally uniform and predictable.

Apparatus for performing such a task should ideally be inexpensive, lightweight and easily manipulated and maneuvered by an individual worker. In addition, the displacement mechanism should be relatively uncomplicated and should not require design and operating considerations of such parameters as effluent tube size, the rate of fluid flow from a rotating propeller in the mechanism, and the drawing or displacement rate of a storage tank into which the material is directed. In addition, the liquid/solid mixture withdrawing mechanism should be reliable and unlikely to be damaged by a mismatch between the aforementioned parameters.

The present invention is intended to provide a vacuum jet apparatus which exhibits all of the aforementioned characteristics in providing for the efficient, safe and reliable removal of a solid/liquid mixture from a storage tank to a vacuum tank which agitates the mixture as it is removed to ensure that even heavy solid deposits on the bottom of the storage tank are removed therefrom.

OBJECTS AND SUMMARY OF THE INVENTION

Accordingly, it is an object of the present invention to provide an improved apparatus for drawing a solid and liquid mixture from a container.

It is another object of the present invention to provide for the thorough blending of a liquid and solid mixture prior to removing the mixture from a holding tank.

Yet another object of the present invention is to provide for the vacuum-assisted displacement of a solid/liquid mixture through a tube by means of a rotating propeller without precise matching of the propeller operating parameters with the vacuum displacement.

Still another object of the present invention is to provide direct coupling between a tube through which a solid/liquid mixture is vacuum-drawn and the vacuum source.

A still further object of the present invention is to provide an improved arrangement for removing a solid/liquid manure mixture from a manure pit for deposit in a liquid manure vacuum spreader.

Another object of the present invention is to provide a lightweight, portable fluid displacement apparatus for agitating a fluid mixture having heavy bottom solids and converting the mixture into an easily displaceable slurry.

Accordingly, the present invention contemplates a vacuum jet apparatus for displacing a liquid and solid mixture having heavy solids which collect at the bottom of the mixture which agitates the mixture to produce an easily extractable slurry. The vacuum jet apparatus includes an elongated tube having a hydraulically driven rotary motor at a first end thereof and an intake assembly at an open second end thereof. The intake assembly includes an intake housing positioned on the second open end of the tube having a plurality of apertures therein through which a fluid passes. The intake assembly also includes a propeller coupled to the hydraulic motor by means of an elongated shaft positioned within and along the length of the tube. The propeller is positioned in alignment with the tube and slightly beyond the lower end thereof so as to direct the fluid mixture up into the tube when rotated with the tube's lower end submerged. The rotating propeller, which extends beyond the end of the tube, also agitates and mixes the fluid allowing solids to be mixed with and put in suspension in the fluid mixture.

An upper end of the tube is directly coupled to a vacuum tank which assists in displacing the fluid upward within the tube and removing it from a pit or holding tank. By positioning the propeller outside of and beyond the fluid carrying tube, matching between propeller dimensions and speed, i.e., propeller displacement, and vacuum drawing capacity is not necessary. In addition, when the vacuum tank is full, the rotating propeller continues to agitate and mix the slurry without the danger of damaging the hydraulic motor and/or the propeller. The vacuum jet apparatus is particularly adapted for removing the liquid/solid waste collected in a hog manure pit and offers the advantages of: the ability to remove solids from the pit; enhanced displacement efficiency which reduces the amount of time required to empty the pit and permits the use of a smaller motor; provides a more consistent content in terms of fertilizer value of removed material from first to last load; and eliminates the requirement for back-flushing of the vacuum tank.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
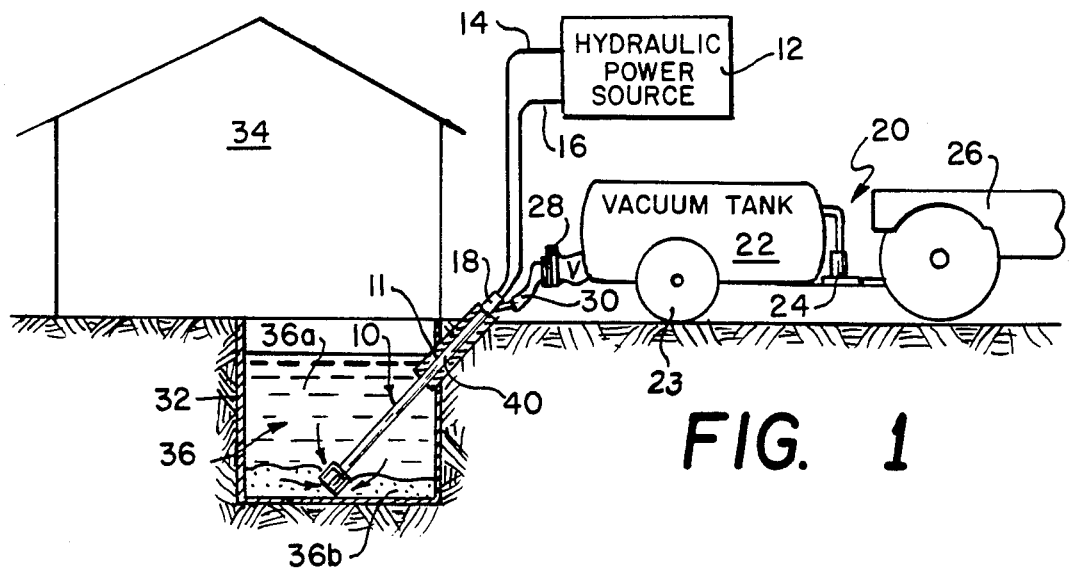
FIG. 1 is a simplified schematic diagram of a vacuum jet apparatus in accordance with the present invention positioned within a solid and liquid filled pit for the emptying thereof.

Referring to FIG. 1, there is shown a simplified schematic diagram of a vacuum jet apparatus 10 in accordance with the present invention as well as the environment in which the vacuum jet apparatus is intended for use.

As shown in the figure, the vacuum jet apparatus 10 is positioned within a tube or pipe 11 which extends from outside of a shed 34 down into a manure pit 32 positioned in the ground and beneath the shed. The pipe 11 affords access to the manure pit 32 without entering the shed 34 and permits the contents of the manure pit to be removed therefrom and used as fertilizer. Waste material 36 in the form of liquid waste 36a and solid waste 36b is deposited in the manure pit 32 by livestock such as hogs housed within the shed 34. The waste material 36 is periodically removed from the manure pit 32 by means of the vacuum jet apparatus 10 of the present invention and is stored in a vacuum tank 22 for later use as fertilizer by the farmer. The solid waste 36b collects as a dense sludge in the lower portion or on the bottom of the manure pit 32 and prior art manure removal arrangements have generally been unable to remove all of the waste material 36 from the manure pit, particularly the solid waste 36b portion thereof. Because the solid waste 36b generally has a higher fertilizer value than the liquid waste portion 36a, it is highly desirable to recover this portion of the waste material 36 for re-use by the farmer as a fertilizer. It is for this purpose that the vacuum jet apparatus of the present invention was designed and developed. However, the principles embodied in the vacuum jet apparatus of the present invention are not limited to use in the removal of liquid and solid waste material from a manure storage pit, but have application in the removal of any solid and liquid mixture from a storage container or tank wherein the solid material collects at the bottom of the storage container and is difficult to remove therefrom.

Figure 2:
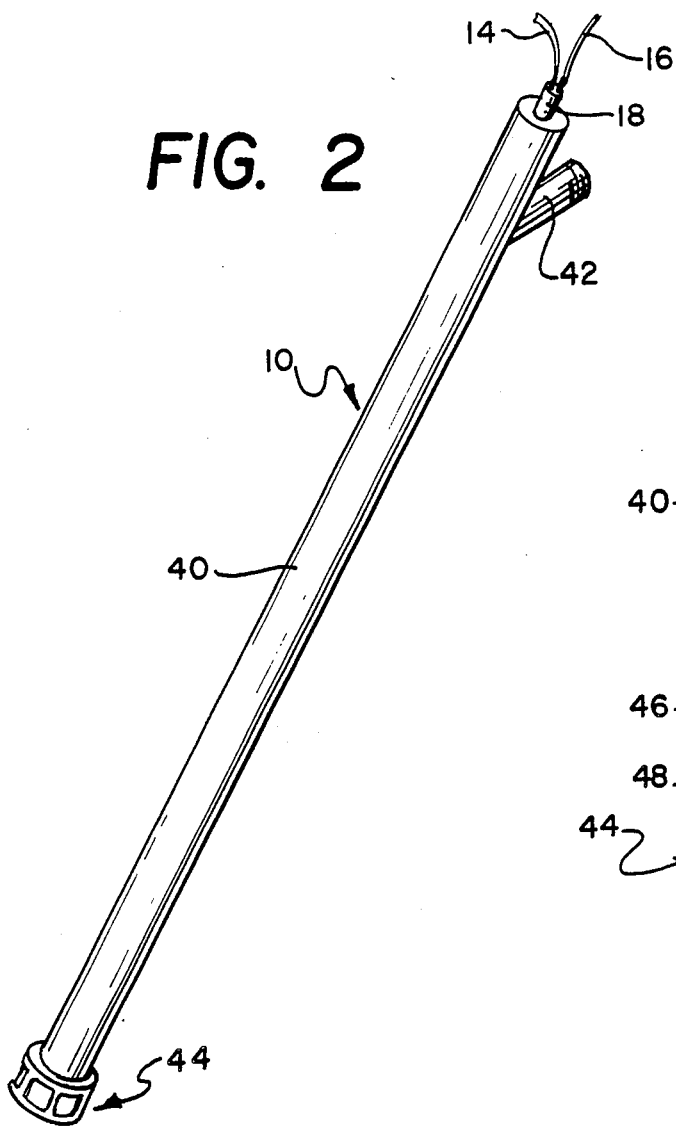
FIG. 2 is a perspective view of the vacuum jet apparatus of the present invention.
Figure 3:
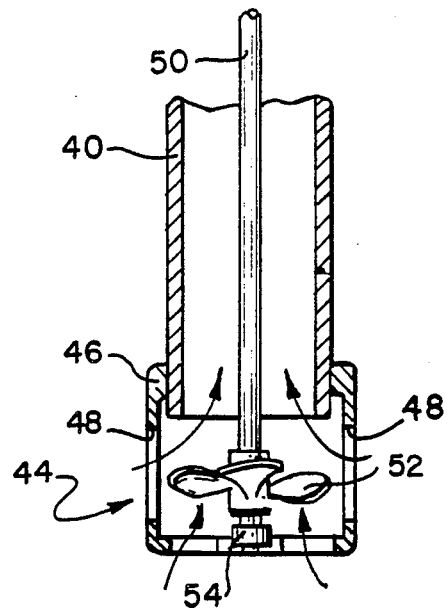
FIG. 3 is a sectional view of the lower intake end of the vacuum jet apparatus of FIG. 2.

Referring to FIG. 1 as well as to FIGS. 2 and 3, which respectively show perspective and sectional end views of the vacuum jet apparatus 10, the configuration and operation of the vacuum jet apparatus will now be described in detail. The vacuum jet apparatus 10 includes a hollow tube 40 extending substantially the length thereof and having mounted to an upper end thereof a rotary hydraulic motor 18. The hydraulic motor 18 is adapted to be driven by a conventional hydraulic power source 12 such as available in a typical tractor (not shown). The hydraulic pump 18 is coupled to the hydraulic power source 12 by means of first and second hydraulic lines 14, 16 and may be operated in forward and reverse modes of operation as desired.

Also positioned adjacent to the upper end of the hollow tube 40 of the vacuum jet apparatus 10 is a vacuum duct 42. The vacuum duct 42 is adapted for coupling to a vacuum hose 30 which, in turn, is coupled to a vacuum tank 22 by means of a vacuum coupling 28. The vacuum tank 22 is coupled to and evacuated by a vacuum pump 24 for drawing the mixed slurry of waste material 36 from the manure pit 32 for deposit and storage in the vacuum tank. As shown in FIG. 1, the vacuum tank 22 is typically provided with a plurality of wheels 23 and is adapted for coupling to a vehicle 26 by means of which the vacuum tank may be moved and relocated as desired such as for spreading the manure stored therein during fertilizing operations.

At the lower end of the hollow tube 40 of the vacuum jet apparatus 10 is provided an intake assembly 44. The intake assembly 44 includes an intake housing 46 having a plurality of apertures 48 therein through which the waste material 36 may flow as shown by the arrows in FIG. 3. The intake assembly 44 is securely coupled to a lower end of the hollow tube 40 by conventional means such as welding.

Coaxially positioned within and along the length of the hollow tube 40 is a rotating shaft 50. The upper end of the rotating shaft 50 is coupled to the hydraulic motor 18 for the rotation thereof, while the lower end of shaft is rotationally coupled to the intake housing 46 of the intake assembly 44 by means of a bearing 54. The bearing 54 facilitates the rotational displacement of the shaft 50 within the hollow tube 40 and the intake housing 46. Positioned on the rotating shaft 50 adjacent to the bearing 54 and within the intake housing 46 is multiblade propeller 52. The propeller 52 is positioned outside of and beyond the lower, open end of the hollow tube 44. Rotation of the propeller 52 draws waste material 36 through the apertures 48 within the intake housing 46 and displaces the waste material upward along the length of the hollow tube 40 toward the upper end thereof. Upward displacement of the waste material is assisted by the vacuum within the hollow tube 40 provided by the vacuum tank 22 coupled thereto. With the propeller 52 positioned outside of the hollow tube 40 and beneath the lower open end thereof, the propeller serves to not only direct the waste material 36 up into the hollow tube 40, but also agitates the solid waste 36b and thoroughly mixes it with the liquid waste 36a to provide the waste material with a fluidity which allows it to be drawn into the intake assembly 44 and displaced upward into and through the hollow tube 40 by means of the combination of the rotating propeller 52 and the vacuum within the hollow tube.

With the propeller 52 positioned outside of the hollow tube 40, the vacuum jet apparatus of the present invention does not function as a pump and eliminates the requirement for matching the speed and the pitch of the propeller blades with the displacement rate of the vacuum tank 22 as in the case of a conventional pump. In a conventional pump, failure to match the angular velocity and pitch of the propeller 52 with the displacement rate of the vacuum source would result in a back pressure developing within the vacuum tank 22. When the vacuum tank 22 is completely filled with waste material 36, all of the air in the vacuum tank is replaced with the waste material mixture which, since the mixture is not compressible, results in the application of a dead load stop to the hydraulic motor 18. This could result in damage to either the hydraulic motor 18 or the propeller 52, or to both. By mounting the propeller 52 slightly below, e.g., one-half inch in a preferred embodiment, the open end of the hollow tube 40, the requirement to match propeller speed and blade pitch angle with the vacuum displacement capacity of the vacuum tank 22 is eliminated. In addition, the propeller 52 is allowed to turn at greater angular velocities than if mounted within the hollow tube 40 such that the portion of the mixture forced up the hollow tube which matches the vacuum displacement of the vacuum tank 22 is deposited therein, while the remainder of the liquid waste thus displaced by the rotating propeller 52 is forced out of the intake assembly 44 in the space between the propeller 52 and the lower, open end of the hollow tube 40. This action results in the thorough blending, chopping and agitation of the liquid and solid waste mixture and also provides vacuum loading assistance to the vacuum tank 22 to facilitate the upward displacement of the waste material in the hollow tube 40. Thus, when the vacuum tank 22 is full, the vacuum jet apparatus 10 of the present invention continues to operate as an agitator to facilitate the removal of the solid waste 36b from the bottom of the manure pit 32.

An additional advantage of mounting the propeller 52 below, or outside of, the hollow tube 40 is that the vacuum jet apparatus 10 of the present invention may be used as a more efficient agitator when not employed in removing the waste material 36 from the manure pit 32. With the propeller mounted within the hollow tube, the arrangement would operate only as a pump wherein the propeller rotates in a first direction to force the waste material up the hollow tube. If the propeller is rotated in a second, opposite direction when positioned within the hollow tube, the propeller functions as a fan forcing only air in the downward direction through the hollow tube because of the tube restriction. However, the vacuum jet apparatus of the present invention is capable of not only displacing and removing the waste material from the manure pit in a first mode of operation, but is also capable of efficiently agitating the liquid and solid waste mixture in a second mode of operation so as to form a slurry which may be more easily and completely removed from the manure pit.

Another feature of providing a rotating propeller 52 so as to force-feed an evacuated hollow tube 40 in accordance with the present invention involves a change in the flow pattern of the liquid to the hollow tube. For example, when using a vacuum tube without a propeller, the liquids are filtered through the solids in the mixture. This filtering action can cause a continual build-up of solids in the manure pit and is evidenced when cleaning out a manure pit in that the first few loads removed therefrom are mostly liquid, while the last loads are comprised primarily of solid waste material even with the open end of the vacuum tube positioned at the bottom of the manure pit. However, the propeller action of the present invention force-feeds the solids up the hollow tube from the bottom of the manure pit providing a more even distribution of the solids throughout the removed solution during cleanout. Because of the different fertilizer values between liquid and solid waste materials, it is important to provide an even distribution of liquids and solids in the mixture removed from the manure pit.

There has thus been shown a vacuum jet apparatus for removing a solid/liquid mixture from a container and providing an even distribution of the solids in the liquid mixture thus removed. The vacuum jet apparatus makes use of the combination of a vacuum drawing tube in combination with a rotating propeller positioned beyond an open intake end of the tube so as to force the liquid and solid mixture up the tube and to agitate the mixture to ensure removal of both the liquid and solid components and a uniform distribution thereof throughout the mixture. The vacuum jet apparatus is adapted for access to a manure pit via a small port opening, is lightweight, weighing less than 100 pounds in one embodiment, is inexpensive to manufacture and maintain, reduces the loading time of the material thus removed, and eliminates the need to backflush the manure pit from which the waste material is removed.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. Apparatus for removing a liquid and solid mixture from a storage tank comprising:
   an elongated hollow tube having a substantially open lower inlet end and an upper closed end, wherein said inlet end is positioned within the liquid and solid mixture and includes an aperture substantially equal in size to a transverse cross sectional area of said hollow tube;
   an intake assembly mounted to and extending outward from the inlet end of said hollow tube, said intake assembly having a plurality of apertures therein and a cross sectional area substantially equal to the cross sectional area of said elongated hollow tube;
   vacuum means disposed outside of said elongated hollow tube and including in combination a vacuum pump and a vacuum tank evacuated by said vacuum pump, said vacuum tank coupled to said elongated hollow tube adjacent to the upper closed end thereof for drawing the liquid and solid mixture up said elongated hollow tube toward the upper closed end thereof in removing the liquid and solid mixture from the storage tank;
   a propeller positioned adjacent to said intake assembly and outside of the inlet end of said elongated hollow tube for agitating and directing said liquid and solid mixture into the inlet end and toward the upper closed end of said elongated hollow tube; and
   drive means disposed outside of and mounted to said elongated hollow tube adjacent to the upper closed end thereof and wherein said drive means is coupled to said propeller for rotationally displacing said propeller in a first direction for removing the liquid and solid mixture from the storage tank, wherein a portion of the liquid and solid mixture directed into said elongated hollow tube by said propeller and not drawn up toward the closed upper end thereof by said vacuum means is directed through the apertures in said intake assembly back into the storage tank for thorough mixing therein.

2. The apparatus of claim 1 wherein said elongated hollow tube further includes a vacuum duct for directly coupling said elongated hollow tube to said vacuum tank.

3. The apparatus of claim 1 wherein said drive means includes a rotary hydraulic motor.

4. The apparatus of claim 3 wherein said hydraulic motor is coupled to and driven by a hydraulic power system of a tractor.

5. The apparatus of claim 3 further including a rotating shaft for coupling said rotary hydraulic motor and said propeller.

6. The apparatus of claim 1 wherein said intake assembly includes bearing means coupled to one end of said rotating shaft for facilitating the rotation thereof.

7. The apparatus of claim 6 wherein the liquid and solid mixture is directed into said vacuum tank for storage therein and wherein the liquid and solid mixture is displaced outward through the apertures in said intake assembly and back into the storage tank and is thoroughly mixed thereby when said vacuum tank is filled with the liquid and solid mixture.

8. The apparatus of claim 7 wherein the liquid and solid mixture in the storage tank is agitated and thoroughly mixed upon rotation of said propeller in a second direction by said drive means.

9. The apparatus of claim 1 wherein the storage tank comprises a manure pit and the mixture is comprised of liquid and solid waste materials.

* * * * *